Patented Feb. 16, 1932

1,845,280

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CATALYTIC REDUCTION OF ORGANIC NITROGEN COMPOUNDS

No Drawing.   Application filed January 23, 1928.   Serial No. 248,979.

This invention relates to the catalytic reduction and hydrogenation of organic nitrogen compounds, especially in the liquid or vapor phase, with or without pressure, at room or elevated temperatures.

According to the present invention organic nitrogen compounds are reduced or hydrogenated in the presence of a new class of catalytic compositions, either in the liquid or the vapor phase, by means of reducing gases of all kinds, for example, hydrogen, gases containing hydrogen, or carbon monoxide, such as water gas, with or without the presence of ethylene, methane and carbon dioxide, water vapors, nitrogen and the like. In fact, any of the ordinary reducing gases may be used. The contact masses used in the present invention contain base exchange bodies or their derivatives. Under the term "base exchange body" are included all natural or artitficial bodies which possess the properties of exchanging their bases for other bases of salt solutions. The base exchanging products used in making catalytic compositions of the present invention or as initial material for derivatives to be so used may possess high base exchanging power or in many cases may possess lower base exchanging power, since the catalytic value of the final compositions is not primarily dependent on the amount of base exchanging power present. In general the base exchange bodies may be divided into three main categories:—Two-component and multi-component zeolites, i. e., base exchange bodies containing chemically combined silicon in their nucleus and non-siliceous base exchange bodies in which all of the silicon is replaced by other suitable acidic or amphoteric metal oxides. Two-component zeolites are the reaction products of two types of initial components, that is to say, metallates and silicates (using the term metallate in a somewhat broader sense as will be defined further on in the description), or metal salts and silicates. Frequently more than one member of a type may enter into reaction, that is to say, a silicate may react with more than one metallate or more than one metal salt. The multi-component zeolites are the reaction products of at least three types of components, that is to say, at least one silicate, at least one metallate, and at least one metal salt.

The base exchange bodies, both zeolites and non-silicious base exchange bodies, may be associated with diluents preferably in the form of a physically homogeneous structure, as will be described below. Either diluted or undiluted base exchange bodies may be present in the contact masses used in the present invention, or their derivatives may be present, but it should be understood that wherever base exchange bodies are referred to both diluted and undiluted products are included.

Base exchange bodies, both zeolites and non-silicous base exchange bodies, may also be transformed into derivatives which possess many of the chemical and most of the physical characteristics of the parent base exchange bodies. Such derivatives may be salt-like bodies, that is to say, the reaction products of base exchange bodies with compounds containing anions capable of reacting with the base exchange bodies to form products which possess many of the properties of salts. A further class of derivatives are the acid leached base exchange bodies. When a base exchange body is subjected to leaching by acids, particularly dilute mineral acids, the exchangeable bases are first gradually removed. The resulting products contain both the more basic and the more acidic components of the non-exchangeable nucleus of the base exchange body, with or without a portion of the exchangeable bases. As the leaching is carried on further, more and more of the relatively positive components of the non-exchangeable nucleus are removed, and if carried to completion the leached product contains only the relatively acid components of the non-exchangeable nucleus. In the case of zeolites the final product from long continued leaching is a complex silicic acid which has many of the physical properties of the original base exchange body. In the description and claims the class of base exchange bodies and their derivatives will be referred to by the generic term "permutogenetic" products.

Catalytically active components may be associated with diluted or undiluted permutogenetic bodies in four main forms, as follows:— (1) They may be physically admixed with or impregnated into the permutogenetic products. (2) They may be physically homogeneously incorporated into the permutogenetic products before the latter have been completely formed in the form of catalytically active diluent bodies or in the form of diluents which have been impregnated with catalytically active substances. (3) They may be chemically combined with or in the permutogenetic products in non-exchangeable form, that is to say, they may form a part of the non-exchangeable nucleus of the base exchange body present in the final contact mass or which is transformed into the derivatives, or they may be chemically combined with the base exchange bodies in the form of catalytically active anions which form with the base exchange body salt-like bodies. (4) They may be chemically combined in exchangeable form either during the formation of the base exchange body or by base exchange after formation. Obviously of course the same or different catalytically active components may be present in more than one of the above described forms, and it is an advantage of the present invention that catalytically active substances may be introduced in a wide variety of forms which gives a large field of choice to the catalytic chemist.

While the different permutogenetic products may vary widely in their chemical characteristics, they all possess a similar physical structure which is characterized by more or less high porosity, frequently microporosity, and great resistance to high temperatures, and in the case of products which have not been acid leached to the point of removal of catalytically active components these components are distributed throughout the framework of the products in atomic or molecular dispersion, as will be described in greater detail below, and this chemical homogeneity is one of the important advantages of some of the contact masses of the present invention.

While three of the methods of combination of the catalytically active substances may be effected with undiluted as well as diluted permutogenetic products, it has been found that for most reactions homogeneously diluted permutogenetic contact masses are of advantage, particularly where the diluents are of a physical nature such as to exert a desired influence on a catalytic activity of the contact masses, as when, for example, diluents are rich in silica, which has been found to have an activating power, or where the diluents by reason of high porosity, capillarity, or surface energy may be considered as physical catalysts or activators.

Base exchange bodies used in contact masses of the present invention behave as if they were products of extremely high molecular weight for catalytically active components can be introduced either into the non-exchangeable nucleus or in the form of exchangeable bases in practically any desirable proportions and the ordinary law of chemical combining proportions, which in compounds of low molecular weight restricts the proportions in which components can be incorporated chemically, appears to be without force, which makes it reasonable to assume that the molecular weight is so high as to completely mask the effect of the law. It is of course possible that the base exchange bodies, or some of them, may be solid solutions of a plurality of related compounds of lower molecular weight. It has not been possible hitherto to definitely settle this question, as base exchange bodies are not readily capable of structural chemical analysis. The present invention is of course not limited to any theory, but irrespective of the underlying reasons the fact that catalytically active components may be chemically introduced in any desired proportions is of enormous importance to the catalytic chemist and gives him the power to produce an almost unlimited number of finely and gradually toned catalysts or contact masses for the various reductions and hydrogenations of organic nitrogen compounds. In all cases the contact masses produced are highly effective by reason of the desirable physical structure of the permutogenetic products contained therein and the wide limits of homogeneous dilution of catalytically active molecules or atoms with resulting uniformity and smoothness of action, which is of great importance, particularly in the sensitive reactions such as the reduction of many aromatic nitro compounds in the vapor phase, a field of reduction catalyses of organic nitrogen compounds for which contact masses used in the present invention are peculiarly adapted.

In addition to the important characteristics with which permutogenetic products endow the contact masses of the present invention it has been found that for many of the reactions coming within the scope of the present invention it is desirable to stabilize the contact masses, and this may be effected by associating with the permutogenetic products or incorporating or forming therein compounds of the alkali forming metals, that is to say, alkali metals, the alkaline earth metals, and the strongly basic earth metals. These compounds appear to slow up or smooth out the catalytic reactions, and will be referred to throughout this specification as stabilizers. While for some reactions strongly alkaline stabilizers are not harmful, it has been found that for many reactions it is important to provide non-alkaline stabilizers, such as for example, the salts or compounds of alkali forming metals which do not possess an alkaline reaction. It is a great advantage of the present invention that in the normal formation of base exchange bodies alkaline forming metal oxides are present as exchangeable bases, and whether used without acid treatment or treated with acid, they form stabilizers which are combined in or associated with the resulting permutogenetic products in an extremely fine state of division in which the stabilizers are peculiarly active. Thus base exchange bodies containing alkali forming metal exchangeable bases may be considered as complex stabilizers.

In addition to the use of stabilizers which are important in a large number of reductions and hydrogenations included in the scope of the present invention, it has been found that the stabilizer action and the over-all efficiency of the contact masses can in many cases be greatly increased or enhanced with the association therewith or chemical combination therein of elements or radicals or groups which are catalytically active but do not possess specific catalytic activity for the particular reaction to be carried out. Thus for example in the case of a hydrogenation reaction, certain catalysts which at the temperatures used in the reaction behave as dehydrogenation catalysts may be added to enhance and tone the catalytic activity of the catalysts or the operation of the stabilizers. Similarly in some cases oxidation catalysts, such as those containing metal elements of the fifth and sixth groups of the periodic system may greatly improve the effectiveness of the contact mass used, especially where it is desirable to produce intermediate products which in some cases are relatively unstable. Some other reduction reactions involve the splitting off of water or in some cases the splitting off of carbon dioxide, and may also involve molecular condensations. In such reactions it is very desirable to incorporate catalysts or catalytic components which are not specific reduction catalysts but which may favor dehydration, splitting off of carbon dioxide or condensation. Such catalysts or catalytic components which are not specific catalysts for the reaction in which they are being used under the reaction conditions obtaining will be referred to throughout the specification as stabilizer promoters, as they appear to enhance the toning effect which can be achieved by stabilizers. The use of this expression should, however, in no sense be taken to limit the invention to a particular theory of action of these non-specific catalysts and in fact in some cases stabilizer promoters may be present where there are no stabilizers.

The tremendous range of chemical groups which may be combined in or with or incorporated in permutogenetic products permits a wide choice of stabilizer promoters as well as specific catalysts and permits their association with the contact masses in an extremely homogeneous and catalytically efficient form. Thus many base exchange bodies or their derivatives may be considered as complex catalysts, stabilizers and stabilizer promoters, as all of these elements may be present in the same chemical compound and sharing the advantages flowing from its desirable physical structure and chemical properties. Of course both stabilizer and stabilizer promoters may be mixed partly or wholly with permutogenetic products and a single stabilizer or single stabilizer promoter may be present partly in physical admixture and partly in chemical combination, as will be clear to the skilled base exchange chemist.

The base exchange bodies which form the important components or initial material for derivatives in contact masses of the present invention may be prepared in any of the well known methods. Thus for example, two-component zeolites may be prepared by wet methods, in which the metallate components or metal salt components, part or all of which may be catalytically active, are caused to react with soluble silicates to form zeolites of alumino silicate or aluminum double silicate types, or the components may be fused, preferably in the presence of fluxes. It should be understood that under the term metallate is included not only the alkaline solutions of amphoteric metal oxides or hydroxides but also alkali forming metal salts of metal acids, such as the oxyacids of metals of the fifth and sixth groups, which in at least one stage of oxidation are not strictly speaking amphoteric, but which products are capable of reacting with silicates to form zeolites, or with other components to form non-silicious base exchange bodies. Throughout the specification this somewhat more general definition of metallates will be strictly adhered to. In the formation of two-component zeolites by wet methods, the final reaction product must be alkaline to litmus, and for products of high base exchanging power it should be neutral or alkaline to phenolphthalein. For the purpose of producing base exchange bodies to be used in the preparation of contact masses of the present invention it is sometimes unnecessary to provide high base exchanging power, and for many purposes zeolites formed under conditions resulting in a final reaction which is acid to phenolphthalein but alkaline to litmus are of advantage. It is not definitely known whether products produced under such circumstances are homogeneous chemical compounds, although in many ways they behave as such. There is, however, reason to believe that in some cases at least mixtures of base exchanging and non-base exchanging polysilicates may be produced. For the purpose of the present specification a product will be considered as a base exchange product if it has any base exchange power at all.

It is desirable for many purposes and particularly where two-component zeolites of high base exchanging power are needed to add the relatively acid components, for example, metal salts in the case of aluminum double silicate type of silicates, to the relatively more alkaline components such as for example soluble silicates. By these means a continuous alkalinity is insured, and this method may be considered as the preferred method in most cases, but the opposite procedure is advantageous for certain contact masses and is included in the invention.

Multi-component zeolites may be prepared by any of the foregoing methods using at least three types of components, that is to say, at least one metallate, at least one metal salt and at least one soluble silicate. In the case of multi-component zeolites, as in the case of two-component zeolites, the conditions of alkalinity should be observed, and for many purposes it is advantageous to add the relatively acid components to the relatively alkaline components, in order to insure continuous alkaline reaction. The multi-component zeolites produced vary in their nature, dependent on the proportion of the different reacting components. Thus where the metallates and silicates predominate over the metal salts the resulting products resemble the alumino silicate type of two-component zeolites. If the metal salts and silicates predominate over the metallates the products resemble the aluminum double silicate type of two-component zeolites, and finally if the metallates and metal salts predominate over the silicates the resulting product resembles more or less non-silicous base exchange bodies. It will be clear that there is no sharp defining line between the three types of multi-component zeolites, and one shades into the other as the proportions of the different components vary. It is an advantage of the multi-component zeolites over the two-component zeolites that the choice of catalytically active components is wider, as some catalytically active elements or groups can only be incorporated in the form of metallates and others only in the form of metal salts. In a multi-component zeolite each catalytically active group can be incorporated in the form in which it is best available.

Non-silicious base exchange bodies are produced by the general methods described above, but instead of bringing about reactions between silicates and other metal oxide components, two or more oxymetal compounds are caused to react, in general, at least one will be a metallate and at least one a metal salt, or in some cases it is possible to bring about action between two different metallates in which one negative radical is more acidic than the other. It is possible to produce non-silicious base exchange bodies in which a plurality of metal oxides are present. It is also possible to produce non-silicious base exchange bodies in which a single metal is present. Thus for example, some metals may be sufficiently amphoteric in character to form both metallates and metal salts which are capable of reacting with each other to produce base exchange bodies.

A special method of producing non-silicious base exchange bodies consists in the gradual neutralization of strongly alkalines salts of the oxyacids of metal elements of the fifth and sixth groups in stages of oxidation in which they are sufficiently amphoteric. The neutralization of other strongly alkaline metallates may also bring about formation of non-silicious base exchange bodies. The converse method, whereby non-alkaline salts of suitable metals are gradually treated with alkali until the reaction is sufficiently alkaline to permit the formation of base exchange bodies, may also be used.

Many metals are capable of entering into the base exchange formation only in certain stages of oxidation, and it is sometimes necessary to introduce such metals in a stage of oxidation different from that desired in the final base exchange body, the change of stage of oxidation being preferably effected during the formation of the base exchange body. Certain other elements may be incorporated in the form of complex compounds of the most various types, such as for example, ammonia complexes and the like.

In addition to the artificial base exchange bodies briefly described above, natural base exchange bodies, such as nepheline, leucite, felspar, and the like, may be used.

The most important contact masses for many reactions contain permutogenetic products, in which preferably the diluents are homogenously incorporated into the base exchange bodies before formation of the latter, or at least before the base exchange body has set after formation. Many diluents, both inert, stabilizing, activating, catalytically active, or having stabilizer promoter effects, can be used. A few of the diluents will be briefly enumerated:—kieselguhrs of all kinds, particularly natural or treated "Celite" earth, silicious powders of various types, powdered permutogenetic products, natural or artificial powders of rocks, stones, tuffs, trass, lava, and similarly volcanic products which are frequently highly porous, greensand, glauconite or its acid leached derivative glaucosil, pulverized slag wool, cements, sand, silica gel, pulverized earthenware, fullers earth, talc, glass powder, pumice meal, asbestos, graphite, activated carbon, quartz meal, various pulverized minerals rich in quartz, metal powders and metal alloy powders, salts of oxymetal acids such as tungstates, vanadates, chromates, uranates, manganates, cerates, molybdates, etc., particularly copper salts of the above, silicates, such as copper silicate, iron silicate, nickel silicate, cobalt silicate, aluminum silicate, titanium silicate, minerals or ores, especially those rich in copper, etc. Finely divided diluents are of great advantage, especially when the average particle size is less than 60 microns, in which case the diluents possess high surface energy, which increases the adsorptive and absorptive capacity of the contact mass, the diffusion speed and porosity. These finely divided diluents may be considered as physical catalysts or activators. Diluted permutogenetic bodies may also be finely divided and used as part or all of the diluents of other base exchange bodies.

The following nine methods are the most effective for the introduction of diluents, but any other suitable methods can be used. Examples of methods for incorporating diluents are described in detail in the co-pending application of Jaeger and Bertsch, Serial No. 95,771, filed March 18, 1926, and any of the methods described can be used in incorporating diluents in the present invention:

(1) The diluents may be mixed with one or more liquid components of the base exchange bodies to be formed when the latter are prepared by wet methods.

(2) Components, either catalytically active, stabilizer promoters, or others, may be precipitated or impregnated into diluent bodies which are then incorporated into the base exchange bodies by any suitable methods of incorporation.

(3) Diluents may be mixed with base exchange bodies when the latter are still in the form of gels, by kneading or stirring, in which case the base exchange gel behaves as an adhesive. The homogeneity and uniformity of the distribution of the diluents is of course not quite so great by this method as by method (1), but for many catalytic reductions and hydrogenations involving organic nitrogen compounds extreme uniformity is not essential.

(4) Diluents may be formed during the formation of base exchange bodies by mixing suitable compounds with the components of the base exchange bodies so that the diluent particles are precipitated during formation. Protective colloids may be added to prevent coagulation of the diluent particles before the base exchange bodies have become sufficiently set.

(5) Compounds may be added which react with certain of the base exchange bodies forming components to produce diluents, for instance salts of the metal acids of the fifth and sixth groups may be added in sufficient excess so that they react with components of the base exchange body to form insoluble diluents, as for example with heavy metal oxides.

(6) Preformed base exchange bodies, diluted or undiluted, artificial or natural, can be impregnated with true or colloidal solutions of catalytically effective components and then dried.

(7) A preformed base exchange body, diluted or undiluted, may be impregnated with a plurality of solutions which react therein to precipitate any desired diluents.

(8) Soluble diluent compounds may be added to the components forming a base exchange body, which after formation retains the compounds in solution and is dried without washing or is treated to precipitate the compounds.

(9) Natural base exchange bodies or artificial base exchange bodies, diluted or undiluted, or their derivatives, may be impregnated with solutions of the desired compounds, which are then precipitated by means of reactive gases.

The nucleus or non-exchangeable portion of the molecules of the base exchange bodies is ordinarily considered to consist of two types of oxides, namely, relatively basic metal oxides, usually amphoteric, and relatively acidic oxides, such as $SiO_2$, some amphoteric metal oxides and some metal oxides which have a distinctly acid character. The nucleus behaves as a single anion and cannot be split by ordinary chemical means, but it is advantageous to consider the two portions of the nucleus as the basic and acidic portions, bearing in mind of course that the nucleus behaves as a single group. The metal compounds which are capable of forming the basic portion of the nucleus are those of the following metals:—copper, silver, gold, bismuth, beryllium, zinc, cadmium, boron, aluminum, some rare earths, titanium, zirconium, tin, lead, thorium, niobium, antimony, tantalum, chromium, molybdenum, tungsten, uranium, vanadium, manganese, iron, nickel, cobalt, platinum, palladium. Compounds of these elements may be introduced singly or in mixtures, in any desired proportions, and may be in the form of simple or complex ions. It should be understood that some of the elements in certain stages of oxidation may be introduced either as metallates or metal salts. Others may be introduced in only one form, and still others may be introduced in a stage of oxidation other than that desired in the final base exchange body or in the form of complex compounds. Among the complex ionogens are ammonia, hydrocyanic acid, oxalic acid, formic acid, tartaric acid, citric acid, glycerine, and the like.

Many of the metals are specific catalysts, others are stabilizers, and still others are stabilizer promoters. Naturally the status of an element as catalyst or stabilizer promoter will vary with the particular reduction or hydrogenation reaction for which the final contact mass is to be used, and the choice of catalysts and stabilizer promoters together with the proportions will be determined by the particular catalytic reduction or hydrogenation of the particular organic nitrogen compound for which the contact mass is to be used.

Examples of components forming the relatively acid portion of the base exchange nucleus are alkali metal silicates, which are soluble in alkali, and alkali metal salts of acids, such as those of boron, phosphorus, nitrogen, tin, titanium, vanadium, tungsten, chromium, niobium, tantalum, uranium, antimony, manganese, etc.

The exchangeable bases of the base exchange bodies may be substituted by base exchange, and the elements which can be introduced singly or in admixture by base exchange are the following:—copper, silver, gold, ammonia, beryllium, calcium, manganese, caesium, potassium, sodium, zinc, strontium, cadmium, barium, lead, aluminum, scandium, titanium, zirconium, tin, antimony, thorium, vanadium, lithium, rubidium, thallium, bismuth, chromium, uranium, manganese, iron, cobalt, nickel, ruthenium, palladium, platinum and cerium.

Depending on the reactions in which the contact mass is to be used, the exchangeable bases introduced may be specific catalysts, they may be stabilizers, or they may be stabilizer promoters. They may be introduced as simple ions or as complex ions, and may enhance the catalytic activity of the final contact mass, improve its physical structure, or both.

As has been described above, base exchange bodies can be caused to react with compounds containing acidic radicals capable of forming therewith salt-like bodies. The radicals may be present in the form of simple acid radicals, polyacid radicals or complex acid radicals, and include radicals containing the following elements:—chromium, vanadium, tungsten, uranium, molybdenum, manganese, tantalum, niobium, antimony, selenium, tellurium, phosphorus, bismuth, tin, chlorine, platinum, boron. Among the complex radicals are ferro and ferricyanogen, certain ammonia complexes and the like. The amount of acid radicals caused to unite with the base exchange bodies to form salt-like bodies may be varied so that the resulting products may possess the character of acid, neutral or basic salts. Most of these acid radicals are stabilizers or stabilizer promoters for the catalytic reduction and hydrogenation of organic nitrogen compounds and especially for the reduction of organic nitro compounds to the corresponding amines, such as nitrobenzene to aniline.

The base exchange bodies diluted or undiluted, or some of their salt like body derivatives, may be treated with acids, such as mineral acids, for example, 2–10% sulfuric, hydrochloric or nitric acids, to remove part or all of the exchangeable bases, or also part or all of the basic portion of the nucleus.

In the case of zeolites, the partial leaching with acid, which leaves part or all of the basic portion of the nucleus or even part of the exchangeable bases, does not affect the function of the zeolites as catalysts when they contain catalytically active elements in the basic portion of the nucleus, or in some cases even exchangeable bases, and such partially leached catalysts are of great importance in many reactions. Where the leaching is carried out to completion the advantageous physical structure remains to a considerable extent the same, but the remainder is of course a form of silica, or in the case of zeolites in which part of the silica is replaced by other acidic compounds, a mixture of the two, and usually will not be a specific catalyst for the reduction or hydrogenation of organic nitrogen compounds. It serves, however, as an advantageous physical carrier of specific catalysts, and in the case of partially substituted zeolites may also contain stabilizer promoters.

Leached non-silicious base exchange bodies, either partially or completely leached, may contain catalytically active components and behave as catalyst, stabilizer promoters or both, and many important catalysts for the reduction and hydrogenation of organic nitrogen compounds are thus obtained. This is particularly the case for reactions where a relatively alkali-free contact mass is required for best results and where the alkaline content of a contact mass containing a base exchange body may be too great for optimum results.

Base exchange bodies or their derivatives, diluted or undiluted, may also be coated in the form of films on massive carrier granules or may be impregnated therein. The massive carriers may be inert, activating, or themselves catalysts. For example, certain catalytic metal alloys, minerals, especially copper minerals, fall within this class. Aluminum or copper alloy granules perform an additional advantageous function in that their relatively high heat conductivity tends to prevent local overheating in highly exothermic reductions or hydrogenations of organic nitrogen compounds which is of considerable importance in obtaining good yields, as many of the reactions, particularly hydrogenations, are equilibrium reactions, and at higher temperatures hydrogenation catalysts reverse their function and tend to favor dehydrogenation with resulting lowering of yields and contamination of the product.

The contact masses of the present invention may be used for all types of liquid and vapor phase reductions and hydrogenations or organic nitrogen compounds. They are particularly suitable for the reduction of aromatic nitrocompounds to the corresponding amines. Among the specific reactions for which the present invention is well suited, a few illustrative examples are the reduction of aromatic nitrocompounds to the azoxy, azo, hydrazo and amino compounds and also the hydrogenation of amino compounds produced. Thus for example, nitrobenzene under suitable reaction conditions can be reduced to azoxybenzene, azobenzene, hydrazobenzene or aniline and hydrogenated amines, such as cyclohexylamine, dicyclohexylamine and cyclohexylaniline. Substituted aromatic nitrocompounds may be similarly reduced to the corresponding reduction and hydrogenation products. Examples of such products are nitrotoluols, nitroxylols, substituted nitrobenzols, nitrotoluols, and the like. Other aromatic nitrocompounds of importance are alphanitronaphthalene, which can be readily reduced by means of the present invention to alphanaphthylamine.

Aliphatic nitrocompounds may also be reduced to the corresponding amines. Thus for example, alkyl nitrites may be reduced to the corresponding amines, and nitromethane can be reduced to methyl amine. A number of reduction or hydrogenation reactions of organic nitrogen compounds which are not to be classed as nitrocompounds are also effectively carried out by means of the present invention. Thus for example, oximes may be reduced, Schiff's bases may be reduced to secondary amines, nitriles to primary and secondary amines, such as benzenitrile to benzylamine or dibenzylamine.

Hydrogenation reactions such as hydrogenation of pyridine to piperidine, pyrrol to pyrrolidine, quinoline to tetrahydroquinoline. Certain nitro compounds may contain both nitro groups and nitrogen in a different form, and may be suitably reduced or hydrogenated by contact masses of the present invention. Thus for example 3-nitropyridine may be reduced to 3-aminopyridine and the like.

The reactions, particularly in the vapor phase, may be carried out with reducing gases, such as hydrogen, gases containing hydrogen, such as water gas, carbon monoxide with or without steam, and the like. In the case of water gas and carbon monoxide, the CO is partly oxidized to $CO_2$. It is desirable to maintain the temperature in vapor phase reactions sufficiently high so that the nitrogen compounds do not condense out, and the wide choice of finely toned catalysts which is given by the present invention is of great importance for the reduction or hydrogenation of organic nitrogen compounds, which because of their high vaporizing temperature, must be reduced under relatively uniform reaction conditions, for as is well known, high temperatures tend to reverse the equilibrium of reaction. The reaction may be carried out at atmospheric pressure, or above or below atmosphere. Pressures above atmospheric are preferably used in the presence of steam.

The vapor phase reductions of nitro compounds to the corresponding amines are preferably carried out at temperatures between 180–250° C., but by the choice of a suitable catalyst and when a large excess of hydrogen is used the reactions may also be carried out at much higher temperatures, for example 300–350° C. In many cases with the highly efficient contact masses of the present invention yields of 98% of the theory and better may be obtained, and the purity of the reaction products is extremely high in most cases. Some permutogenetic contact masses withstand high temperature very effectively, and possess a high resistance to recrystallization and poisoning, and the life of the contact masses is very long, an important feature in reduction processes. In some cases, particularly with highly diluted contact masses, the mechanical strength may be somewhat deficient, and in such cases it may be desirable to wash the permutogenetic body after drying with a soluble silicate to effect surface silicification.

Many of the reactions may be carried out by a single passage over the contact mass, but other reactions are preferably carried out in a circulating process in which the gases are continuously recirculated with suitable means for removing products of reaction. In such circulating processes very large excesses of hydrogen can be used and are favorable. The excess of hydrogen may in many cases amount to ten times or more the theoretical amount required.

As the contact masses of the present invention permit a tremendous field of choice of stabilizer promoters, many reactions which involve not only reduction or hydrogenation may also involve the splitting off of water or carbon dioxide or other reactions, can be carried out with great effectiveness with contact masses of the present invention in which suitable stabilizer promoters are present having a catalytic activity for the splitting off of water or carbon dioxide or for condensation or other reactions. For certain other reactions, particularly where the reduction is to proceed to an intermediate product of relatively unstable character stabilizer promoters which are oxidation or dehydrogenation catalysts under the reaction conditions may effectively tone the contact masses so as to permit a very accurate and fine control of reaction.

While an enormous variety of contact masses containing the most various catalysts can be prepared under the principles of the present invention, the most effective contact masses for many reactions, particularly the reduction of the aromatic nitrocompounds to the corresponding amines are those containing permutogenetic products having associated therewith or chemically combined therein or therewith one or more of the elements, copper, tin, silver, nickel, iron, cobalt, or zinc. These contact masses are especially effective when they contain stabilizer promoters such as dehydrogenation catalysts, water splitting catalysts or oxidation catalysts.

180°–250° C. is a suitable temperature for the reduction of aromatic nitro compounds with hydrogen or hydrogen-containing gases to the corresponding amines without hydrogenation of the aromatic nucleus, especially when highly effective contact masses are used which contain silver, copper or tin as the main reduction catalytic components. In some cases higher temperatures may be used, up to about 340° C., especially when a large excess of reducing gases is used. In this way an excellent yield of very pure aniline can be obtained from nitro-benzene, the products containing only traces of azobenzene which can be easily separated from the aniline by distillation. Under similar conditions nitrotoluols can also be converted to toluidines with good yields at 250–350° C., the product being of excellent purity. Halogen substituted nitro compounds can also be easily reduced with the same type of contact masses, as can polynitrocompounds, such as dinitrobenzenes, dinitrotoluols, dinitrophenols, and the like. When the contact masses contain iron, nickel or cobalt as the main effective reduction catalytic components reductions should be carried out at somewhat lower temperature to prevent the formation of a large amount of by-products.

Practically all contact mass compositions used in the present invention should be subjected to preliminary treatment with reducing gases in order to increase their reactivity for the reduction or hydrogenation or organic nitrogen compounds. This preliminary treatment and the catalytic reductions themselves produce secondary chemical changes in the contact mass composition, particularly at the surface, and may change the chemical character of the permutogenetic products present, although usually the advantageous physical structure seems to remain unaffected. For this reason the contact masses will be referred to as of the time they are freshly prepared, as is customary in catalytic chemical nomenclature. It is an advantage of contact masses of the present invention that in many cases a much higher loading per volume of contact mass is possible than in the case of contact masses used hitherto. The normal loading is about 50–80 parts by weight per 1,000 corresponding parts by volume per day, but with many of the contact mass compositions of the present invention, including some described in the specific examples which will follow, an overloading up to 50% and more can be used without affecting the purity of products and without seriously diminishing the life of the contact masses. These important increases in efficiency can be obtained with particular ease in converters which do not allow accumulation of heat to any appreciable extent in the contact layers. Such examples are those of the automatic heat exchange type, as described in my co-pending application, Serial No. 234,660, filed Nov. 21, 1927. It should be understood of course that the reduction or hydrogenation of organic nitrogen compounds in this type of converter is not claimed broadly in this application, which is limited to processes using contact masses containing permutogenetic bodies.

When converters with effective temperature control are used in conjunction with recirculation, the flow of reducing gases may be kept at a very moderate figure. Thus for example in many cases the circulation of 1 to 3 times the contact mass space per hour is entirely sufficient. When the loadings are increased, however, the flow must be suitably adjusted in order to prevent heat accumulations which may reverse the action of the catalysts.

Not only is the efficiency of the contact masses of the present invention superior to those which have been used hitherto, but the production period of plant operation with the same contact masses is also very high, and in many cases plants using contact masses of the present invention may be run for six to eight months without deterioration of the efficiency of the contact mass.

When contact masses of the present invention finally show deterioration by reason of poisoning due either to poisons in the organic nitrogen compounds or in the reducing gases used, they can be regenerated directly in the converters by treating them with oxygen-containing gases, the oxygen-containing gases being gradually increased at first, the temperature being maintained at 250–450° C. After uniform oxidation of the contact mass has been obtained, it can be reduced with reducing gases at 220–320° C.

The reduction of many organic nitrogen compounds and particularly the reduction of aromatic nitrocompounds may result in products contaminated with certain by-products which decrease their value. The formation of by-products can to a large extent be avoided by using a very high ratio of reducing gas to compound reduced. Thus the ratio may be about 1:10, although of course higher or lower ratios are advantageous. For very sensitive reactions, especially when the contact mass used is highly active, ratios as high as 1 part of compound to 30–50 parts of reducing gases may be desirable, particularly in circulatory processes.

While many of the contact masses of the present invention are of particular importance for vapor phase reductions and hydrogenations of organic nitrogen compounds, with or without pressure, many of them are highly active in liquid phase reduction with or without pressure or in reductions which take place in suspension. The following specific examples will describe a number of typical contact masses according to the present invention, together with reaction conditions for representative reductions or hydrogenations of organic nitrogen compounds. The examples are illustrations only, and the invention is in no sense limited to the details therein set forth.

*Example 1*

210–340 parts of $SiO_2$ in the form of a commercial sodium waterglass solution are diluted with 4 to 6 volumes of water and ammonia is added carefully until the cloudiness which forms at first clears up. 296–300 parts of copper nitrate with 6 mols of water are dissolved in sufficient water to produce a 10% solution, and enough concentrated ammonia is added so that the precipitate which first forms again dissolves to a deep blue solution. The blue solution is then poured into the waterglass solution, stirred and heated to 60–80° C. The reaction mixture soon solidifies to a gel, which on further stirring is transformed into granular aggregates. The precipitate, which is of a light blue color, is pressed, dried and broken into fragments of greenish-blue color and possessing a conchoidal fracture. On treatment with hot water the fragments break up into smaller granules which have base exchange properties and constitute a sodium copper zeolite or sodium ammonium copper zeolite in which the copper is present in non-exchangeable form and cannot readily be dissolved out by ammonia.

The granules are preferably treated at 250–320° C. with hydrogen containing gases, and the reduced catalyst thus obtained gives excellent results in the reduction of aromatic nitro compounds to amines. Thus for example, nitrobenzene is easily reduced to analine, using hydrogen or purified water gas at temperatures between 180 and 240° C. The process is preferably carried out as a circulatory process, and higher loadings than normal can be used, since the catalyst is very concentrated. The normal loading is about 50 to 80 parts by weight of nitrobenzene per 1,000 volumes of contact mass per day, but the catalyst can be overloaded 40 to 60% without affecting the purity of the product to any considerable extent and without seriously shortening the efficient life of the contact mass. When overloading the contact mass the percentage of reducing gases should preferably be higher than normal. 20 to 40 times the theoretically required amount of hydrogen or corresponding amounts of other reducing gases are very favorable, and the gas speed should be such that the contact volume is renewed from 6 to 8 times an hour in order to avoid heat accumulation in any portion of the contact mass. Best results are obtained by using new types of converters, for example those provided with automatic heat exchange devices embedded into the contact mass which do not allow accumulation of heat. Such converters are for example described in my copending application, Serial No. 234,660, filed November 21, 1927.

Diluents can be introduced into the contact mass during formation without any reduction of its efficiency or capacity. Examples of such diluents are kieselguhr, pumice meal, charcoal powder, finely divided pyrolusite, powders of natural or artificial diluted and undiluted zeolites, powders of rocks, tuffs, trass of volcanic origin, greensand, glaucosil which is the acid leached residue of greensand, silica gel, pulverized earthenware and similar bodies. These diluents can be stirred into the waterglass solution or the cuprammonium nitrate solution, or if desired they may be incorporated into the mixed solutions or during the formation of the base exchange body. Another method of introduction consists in kneading the diluents into the base exchange gel after the latter has been formed.

The contact mass as described above, can be toned by introducing stabilizer promoters which favor the splitting off of water. Such stabilizer promoters are compounds of aluminum, thorium and titanium. The stabilizer promoters can be introduced by base exchange, replacing part of the sodium, and can be introduced either singly or in admixture. Thus for example the diluted or undiluted copper zeolite may be treated with a 5 to 10% solution of thorium nitrate, which is permitted to trickle over the zeolite while the latter is on a filter. It is not necessary to exercise great care in accurately determining the exact amounts of stabilizer promoter added, as exact amounts are not essential and may vary within considerable limits without affecting the efficiency of the contact mass.

Copper zeolites toned with stabilizer promoters as above described when used under the above reaction conditions give an aniline of high purity, being between 98 and 99% pure, and containing only traces of azobenzene as an impurity. This latter can be readily removed by a single distillation. When a circulatory process is used therefor the yields may be considered practically theoretical.

*Example 2*

Four solutions are prepared as follows:
(1) 75 to 80 parts of $SiO_2$ in the form of a 2 N ammoniacal waterglass solution are mixed with sufficient powdered pumice stone to form a thin paste.
(2) 15 parts of $Al_2O_3$ in the form of a hydroxide containing 3 mols of water are obtained by the precipitation of a corresponding amount of aluminum nitrate solution with ammonia, and are dissolved in a 2 N sodium hydroxide solution to form sodium aluminate.

(3) 60 parts of copper nitrate containing 6 mols of water or a corresponding amount of solutions of other copper compounds are dissolved in a 10% ammonia solution to form an aqueous solution of the cuprammonium compound.

(4) 3 to 4 parts of $V_2O_4$ freshly prepared by the reduction of a corresponding amount of $V_2O_5$ by means of gas containing $SO_2$ in an acid water suspension at boiling temperature are precipitated out, washed and dissolved in 10 N KOH solution to form the corresponding potassium vanadite. An equivalent amount of potassium chromite may be substituted for the vanadite, or a mixture of the two may be used.

Solutions (2) and (4) are poured into suspension (1) and the mixture is warmed to 60–70° C. with vigorous agitation, whereupon solution (3) is introduced in a thin stream. The reaction product soon solidifies in the form of a blue-green gel, and the yield can be increased by careful addition of 2 to 3% hydrochloric acid. The gelatinous precipitate is poured off, dried below 100° C., and then hydrated by causing water to trickle over it. The body obtained possesses good base exchange powers, and can be used for the catalytic reduction of organic nitro compounds. Thus the vapors containing 3-nitropyridine mixed with a gas of hydrogen may be passed over the contact mass after the latter has been pretreated with hydrogen containing gases at 220–230° C. The reaction temperature should be about 200–250° C., and good yields of 3-aminopyridine of high purity are obtained. The product is crystalline, and possesses a melting point of about 63° C.

*Example 3*

(1) 60–80 parts of "Celite" brick refuse are impregnated with 22 parts of freshly precipitated CuO. The impregnation may advantageously be effected by impregnating the "Celite" brick refuse with a 10% copper nitrate solution and then precipitating the oxide with 2 N sodium hydroxide solution with vigorous agitation. The whole amount is filtered off and then washed until free from alkali.

(2) 7.75 parts of $WO_3$ are dissolved in 2 N sodium hydroxide solution to form the sodium tungstate.

(3) 3.4 parts of $Al_2O_3$ in the form of freshly precipitated aluminum hydroxide are dissolved in a normal sodium hydroxide solution to form the sodium aluminate. The aluminate and tungstate solutions are then poured together with vigorous agitation and the diluent impregnated with copper oxide is then added. After intimate mixture the diluted base exchange body which forms is precipitated out with the addition of a normal nitric acid solution, which is added gradually, care being taken that the final reaction product is alkaline or neutral to phenolphthalein. The reaction mixture is freed from the mother liquor by sucking, washed with about 200 parts of water and then dried at temperatures preferably below 100° C. The dried precipitate is broken into small fragments suitable for filling into a converter with automatic heat exchange elements, as referred to in Example 1, and is then carefully reduced in a stream of hydrogen containing gas at 250–300° C. The contact mass so provided is well suited for the catalytic reduction of aromatic nitro compounds to the corresponding amines. Thus for example vapors of nitrotoluols or nitroxylols when passed over the contact mass with a large excess of reducing gases, such as hydrogen, in a circulatory process at 200–250° C., are reduced to the corresponding toluidines and xylidines. Preferably the amount of hydrogen should be about ten times the theoretical amount required to effect the reduction of the nitro group.

The contact mass may be considered as a base exchange body containing tungsten and aluminum in non-exchangeable form, and does not have a specific catalytic activity for the reaction. The catalytically effective component is introduced in the form of the diluent, and the combination results in a well toned contact mass for these particular purposes. The embedded copper oxide may be substituted by tin oxide or silver oxide, or a mixture of two or three of these components may be used. Small amounts of cobalt and nickel oxides may be added as diluents in some cases.

The non-silicious base exchange body may contain other components, such as $V_2O_5$, $V_2O_4$, $MoO_3$, and the aluminum containing component may be substituted partly or wholly by other amphoteric metal oxides, such as cadmium and zinc oxides. The contact masses produced are also highly effective.

*Example 4*

A tin or copper base exchange body containing tin or copper in non-exchangeable form is prepared as follows:—40 to 50 parts of $SiO_2$ in the form of a commercial waterglass solution are diluted with 4 to 5 times its weight of water. 75 parts of aluminum nitrate containing 9 mols of water are precipitated with 20% ammonia solution, and the resulting aluminum hydroxide is transformed into corresponding sodium aluminate by means of 2 N sodium hydroxide solution. 50 parts of pumice meal are incorporated in the waterglass solution, and the aluminate is then added. A 20% solution of $SnCl_2$ containing 2 mols of water is prepared and added to the aluminate-waterglass mixture until the reaction is slightly alkaline to phenolphthalein. A gel is formed, which is filtered and washed. The SnCl₂ solution may be substituted by a corresponding amount of a 20% copper nitrate solution.

The product obtained is a so called three-component zeolite which contains in non-exchangeable form aluminum and tin or aluminum and copper, and constitutes an excellent contact mass for the catalytic reduction of aromatic nitro compounds to the corresponding amines. The effectiveness of the contact mass can be still further improved by sucking and washing until the wash water gives no test for chlorine, and then incorporating in the following non-silicious base exchange body as a diluent:

10.2 parts of Al₂O₃ in the form of freshly precipitated aluminum hydroxide are dissolved in a solution containing 40 parts of 100% KOH in 200 parts of water. The zeolite body described above is incorporated in this solution and a 10% water solution containing 44.4 parts of aluminum sulfate with 18 mols of water is added to the aluminate mixture with vigorous agitation. If desired a corresponding amount of titanium sulfate, zirconium nitrate, zinc nitrate, thorium nitrate, nickel nitrate, or a mixture, are substituted for the aluminum sulfate. The reaction product obtained is a non-silicious aluminum base exchange body which is not a specific catalyst for the reduction reaction, but is diluted with a catalytically active three-component zeolite and forms a well toned contact mass for the catalytic reduction and hydrogenation of aromatic nitro compounds such as nitrobenzene to aniline, chlornitrobenzene to chloraniline, alphanitronaphthalene to alphanaphthylamine, etc.

The reaction product is sucked, pressed and thoroughly washed with water, dried and broken into fragments. The fragments may be treated with 2 to 5% copper nitrate solution to partly replace the alkali in the exchangeable portion of the base exchange body. Cobalt nitrate, iron nitrate, nickel nitrate, alone or in admixture, may partly or wholly replace the copper nitrate. The products may also be treated with salts of the oxymetal acids of the fifth and sixth groups of the periodic system, such as acids of vanadium, tungsten, molybdenum, tantalum, chromium or uranium. For example, a 1% ammonium vanadate solution may be used, and in all cases a so called salt like body is formed after the soluble components have been washed out.

In the contact masses described in this example the non-silicious aluminum base exchange body may be considered as a complex stabilizer for the catalyst, and includes stabilizer promoters. The stabilizer action may be still further toned by the addition of other stabilizer promoters, such as the silicates of the heavy metals, such as copper, titanium, manganese, zirconium, cerium, thorium, and the light metals, such as beryllium, calcium, magnesium and barium. One or more of the silicates above mentioned may be added, and they may be advantageously formed in situ. The amount of stabilizer promoter depends on the particular catalytic reduction for which the contact mass is to be used, but in general from 2 to 5% of such stabilizer promoters give good results. Instead of forming the stabilizer promoters in situ they may of course also be introduced in the same manner as any other diluent.

A further method of introducing stabilizer promoters consists in substituting part or all of the metal salt component of the base exchange body with corresponding amounts of a 5–10% solution of beryllium nitrate, zirconium nitrate, thorium nitrate, or aluminum nitrate. The catalytic efficiency of the mass may also be enhanced by the introduction of catalytically effective elements by base exchange, using for example 5 to 10% solutions of copper nitrate, silver nitrate, tin chloride, nickel nitrate, iron nitrate, etc., singly or in admixture, the choice of salt solution depending on the particular reduction for which the contact mass is to be used.

Instead of embedding the catalytically active base exchange body in a catalytically inactive nonsilicious base exchange body it may be embedded in well known diluted or undiluted base exchanging polysilicates or natural neutral polysilicates or artificial neutral polysilicates. Base exchanging aluminum, cadmium, titanium, zirconium, silver, copper and nickel, two- or three-component polysilicates or zeolites are well suited for this purpose. In the case of products containing silver, copper or nickel, they may be considered as additional catalytically effective components.

If large amounts of nickel, cobalt or iron, or mixtures of them, are used as components for the preparation of such contact masses the aromatic nitro compounds are not only reduced to the corresponding amino compounds but in many cases are further hydrogenated. Thus nitrobenzene is not only reduced to aniline, but undergoes further reduction to cyclohexylamine, dicyclohexylamine and cyclohexylaniline. The proportions of these reaction products obtained will depend on the reaction temperature and the amount of hydrogen used. At low temperatures, such as 180–200° C., the main product is aniline, while at higher temperatures, such as 220–270° C., hydrogenated amino compounds are the main reaction products. A suitable excess of reducing gases may be used, which may be 5–15 times the theoretical amount necessary for the reduction and hydrogenation to be carried out.

Example 5

60 parts of finely ground pumice meal are impregnated with 15-20% by weight of copper nitrate in solution, and are then treated with a sufficient 10% sodium hydroxide solution to precipitate the copper in the form of the hydroxide in a fine state of division throughout the pumice meal. This product is then stirred into 24-30 parts of a commercial sodium water glass solution which has been sufficiently diluted with water so that the pumice meal can be suspended in it. The suspension is then rendered weakly ammoniacal and 9 parts of copper in the form of diluted cuprammonium nitrate or cuprammonium carbonate and one part of aluminum in the form of a saturated sodium aluminate solution are added. A thin stream of 10% copper nitrate solution is then introduced in sufficient amount to precipitate out a sodium aluminum copper base exchange body, which is diluted with pumice meal impregnated with copper hydroxide. The reaction product should be neutral or alkaline to phenolphthalein or only weakly acid to phenolphthalein, being strongly alkaline to litmus in all cases. The precipitate is pressed, moderately washed, dried at 80-100° C., and then broken into fragments.

The product obtained is preferably reduced with hydrogen containing gases at 220-350° C., and constitutes a firm, non-pyrophoric and non-dusting contact mass, which is eminently suited as a catalyst for the reduction of nitro compounds to amines by means of hydrogen containing gases. Thus for example, nitrobenzene can be reduced to aniline at 180-260° C., particularly in a circulatory process with a large excess of hydrogen. The circulatory process permits a very complete and effective utilization of all of the hydrogen and the yields obtainable are almost theoretical.

The materials used in the construction of the converter should be chosen with care. Preferably the converter should be made of copper, or at least all parts coming in contact with the reaction gases should present a surface of copper. If iron is used in the converter it is desirable to inactivate it by coating it with contact masses described above or with components of such contact masses. The iron may also be inactivated with alkali forming metal salts of the metal acids of the fifth and sixth groups of the periodic system. In the circulatory process the aniline and water formed by the reduction of the nitrobenzene are separated out from the gases containing the excess hydrogen before the latter are recirculated. The hydrogen gases are then adjusted to the desired volume and provided with the correct amount of nitrobenzene. Almost quantitative yields are readily obtained in such a process.

The grade of purity of the aniline produced can be readily seen from the following distillation data of sample prepared by the process of this example. 1,364 grams of crude aniline were distilled with the following results:

| Fraction | Temp. uncorr. | Water condensed gr. | Aniline condensed gr. | % aniline in distillate by diazo value | Weight aniline on 100% basis | Remarks |
|---|---|---|---|---|---|---|
| Ia | 98-179.5° | 55 | | | | Saturated with aniline. |
| Fore-runnings. | | | | | | |
| Ib | 179.5-180° | | 25 | 98.6 | 24.6 | Contains small amount of water. |
| Fore-runnings. | | | | | | |
| II | 180-181° | | 1249 | 100 | 1249 | Chemically pure. Boiling range shown by standard test —0.7° from start to 98 cc. |
| Middle runnings. | | | | | | |
| III | 180-181° | | 25 | 97.5 | 24.4 | Contains trace of impurities. This fraction was blown over by a stream of nitrogen. |
| After runnings. | | | | | | |
| IV Residue | | | 3 | | | 3 gr. of dark colored resinous material. |
| V Distillation loss | | | 7 | | | Remaining in space of still column. |

According to this data the water content is __ 4.03%
aniline _____ 95.1
residue ____ 0.22
and loss _____ 0.51 which makes a total value of 99.86%

The weight of aniline, including water content is 1,364 grams, and when the 55 grams of water saturated with aniline are subtracted the difference is 1,309 grams. The aniline obtained on 100% basis is 1,298 grams of a purity of 99.2 to 99.3%, not taking into consideration the 7 grams lost in the distillation nor the aniline content of the 3 grams of residue. This distilled aniline is nearly 100% chemically pure. The crude anilne contains a trace of a substance which causes the development of a dark brown color in the course of several days' standing. The quantity of this impurity, however, is too small to determine its exact nature, but it does not affect the distilled product, since it remains behind as a still reduce. The boiling range on 100 cc. of the distilled aniline is 0.5° C. from 2 cc. to 97 cc. as compared to the 1° range specified for commercial aniline. No trace of nitro compounds can be found. Acetanilide made from the distilled aniline is an excellent product in all respects, having a melting point of 113.9° C., a further evidence of the purity of the aniline obtained.

Example 6

45–55 parts of of $SiO_2$ in the form of a sodium waterglass solution sufficiently diluted with water is mixed with 50 parts of monazite sand refuse, 50 parts of glaucosil (the acid leached residue of greensand), and 50 parts of copper ore, such as malachite, the dilution being sufficient so that the suspension just remains easily stirrable. 10 parts of $Al_2O_3$ in the form of saturated sodium aluminate solution is stirred in, and the mixture is then treated with 15 parts of cupric nitrate containing 3 mols of water in the form of a 25–30% solution and 20 parts of a saturated chromium nitrate solution containing 9 mols of water. A base exchange body is precipitated, which is separated and washed in the usual manner. After drying the mass at temperatures preferably below 100° C., it is submitted to the action of a damp atmosphere and then put on a filter and hydrated by trickling water over it. After hydration is complete the water is replaced by 2–3% hydrochloric or nitric acids, in order to remove part of the exchangeable alkali metal present in the base exchange body. The leaching treatment is continued until 25–30% of the exchangeable alkali is removed, whereupon the partially leached diluted base exchange body is carefully washed in order to free it from hydrochloric or nitric acid and is again dried.

The contact mass obtained as described above is very effective for the catalytic reduction of aromatic nitro compounds and especially for the production of alphanaphthylamine from alphanitronaphthalene at 240–280° C. in the presence of a large excess of hydrogen, preferably in a circulatory process. The alphanaphthylamine obtained is practically pure. In a similar manner aniline can be produced from nitrobenzene at 200° C., toluidines from the corresponding nitrotoluenes at 220–230° C., 1-amino-2.3-dimethyl benzene from the corresponding nitroxylene or amino chlorbenzenes from the corresponding chlornitrobenzenes at 200–210° C., diaminophenols from dinitrophenols at 260° C., and phenylene diamine from dinitrobenzene at 260° in the presence of an excess of hydrogen containing gases such as hydrogen and water gas. Both yields and purity of products are excellent. The contact mass described in this example is highly resistant to poisoning by impurities present in the reaction gases. Nevertheless it is advantageous to use purified benzenes as raw materials, particularly products free from thiophenes, as by this means the life of the contact mass can be prolonged. Such benzenes or homologues can be easily and cheaply produced by chlorine treatment in the presence or absence of catalysts, particularly those which favor the chlorination of the impurities. Traces of chlorine which may remain in such benzenes or their homologues do not poison the contact mass, and the nitro compounds produced from such benzenes can be used in the crude form without preliminary distillation and without impairing the efficiency of the contact mass over months of use. If the contact mass described above is more extensively leached to remove as much as possible of the exchangeable alkali the resulting contact mass can be effectively used for the reduction of nitromethane to methylamine at 180° C. in the presence of a large excess of hydrogen. The yields are excellent and the product is free from unreduced nitromethane.

Similar results may be obtained when the copper is partly or entirely replaced by corresponding tin compounds. A desirable additional catalytic effect for many of the reductions described above can also be brought about by the incorporation of small amounts of silver, nickel, cobalt or iron compounds in the base exchange bodies during formation.

Example 7

Base exchange bodies, natural or artificial, can be effectively used as carriers or skeletons for catalytic components for the reduction or hydrogenation of organic nitrogen compounds. An example of such a contact mass is the following:

45–55 parts of $SiO_2$ in the form of a diluted sodium waterglass solution are mixed with enough kieselguhr or pumice meal so that the mixture just remains readily stirrable, and then 10 parts of $Al_2O_3$ in the form of a 10% sodium aluminate, prepared by dissolving freshly precipitated aluminum hydroxide, is combined with the waterglass-kieselguhr suspension. A 10% solution of aluminum chloride or nitrate containing 7.5 parts of $Al_2O_3$ with or without the addition of silicates such as calcium or magnesium silicates, is added to the aluminate waterglass suspension with vigorous agitation. A gelatinous mass precipitates out, and after suitable separation and drying it is hydrated by means of water. The mass obtained has practically no catalytic effectiveness for the reduction of nitro compounds. The product is then leached with a 2–3% solution of sulfuric, hydrochloric, or nitric acid, in order to remove the maximum amount of exchangeable alkali. The leached base exchange body obtained is impregnated with solutions or suspensions of tin or copper compounds or a mixture of both. Thus for example, copper formate, copper oxalate, copper nitrate, or freshly precipitated copper carbonate with or without the presence of silver or zinc salts may be so introduced. The mass obtained is then reduced with hydrogen containing gases at 250–300° C., and is well suited for the catalytic reduction of aromatic nitro compounds to the corresponding amines, such as nitrobenzene to aniline, the reaction conditions being the same as those described in former examples.

If the leaching is further extended so that part of the aluminum oxide is removed as well as the exchangeable alkali, a complex silicic acid compound diluted with silicates is obtained and is an excellent diluent for base exchange bodies by reason of its high absorptive and adsorptive power. Any other natural or artificial, diluted or undiluted zeolite may be treated in the same way as the three-component zeolite described above.

*Example 8*

40–50 parts of $SiO_2$ in the form of commercial sodium waterglass solution is diluted with 8–10 volumes of water and ammonia is added until the cloudiness which forms at first clears up. Kieselguhr, pumice meal, charcoal, colloidal $SiO_2$ or pulverized, silver free nickel ore is stirred in until the mixture just remains readily stirrable. A 10% aluminum nitrate solution is prepared, and 30 parts of nickel nitrate containing 6 mols of water are dissolved in diluted ammonia water to form a complex nickel ammonium nitrate solution. The nickel ammonium nitrate solution is stirred into the waterglass suspension and sufficient aluminum nitrate solution is added until the reaction mixture becomes weakly alkaline or neutral to phenolphthalein. A stiff light blue gel precipitates, which on stirring is transformed into readily filterable aggregrates. The precipitate is a diluted base exchange body containing nickel and aluminum in non-exchangeable form and sodium and ammonium in exchangeable form. The mechanical strength of the product can be increased by washing with dilute waterglass solution and drying, and it constitutes an excellent contact mass for the catalytic reduction and hydrogenation of organic nitrogen compounds.

The contact mass so prepared can also be pulverized and reduced with hydrogen containing gases at 250–350° C., and can be used for the catalytic reduction and hydrogenation of organic nitrogen compounds in liquid phase at room or elevated temperatures with or without pressure. The finely divided contact mass can also be coated onto granular carrier materials of natural or artificial origin, such as fragments of pumice, diatomaceous stones, earthenware fragments, metal granules, and the like. Artificial carrier materials include kieselguhr-waterglass compositions. Organic or inorganic adhesives may be used to cause the contact mass to adhere to the carrier fragments. These contact masses can be used for vapor phase or liquid phase reductions or hydrogenations of organic nitrogen compounds. When the reaction is carried out in the liquid phase the organic nitrogen compounds in the form of liquids or solutions are preferably allowed to trickle over the fragments of contact mass in a tower in the presence of hydrogen or hydrogen containing gases, which may advantageously flow in counter current to the liquid.

Similar base exchange bodies which form valuable reduction catalysts can be prepared by replacing part or all of the aluminum nitrate by corresponding solutions of salts of thorium, titanium, chromium, beryllium, zinc, zirconium, vanadium, cadmium, lead, copper, silver, gold or tin. The particular strength of solution is not essential, and may vary considerably.

Analogous products may also be obtained by substituting the alkali metal cations by water splitting cations, such as aluminum, thorium, titanium, chromium, beryllium, zirconium, vanadium or zinc. In some cases it is also desirable to introduce nickel by base exchange. The introduction of alkaline earth metals by base exchange is also sometimes advantageous, as it increases the resistance of the contact mass to poisons present in the reacting gases or vapors.

Salt-like bodies of the base exchange bodies described above can be formed by causing them to react with salts of the acids of tungsten, chromium, molybdenum, or vanadium, after base exchange has taken place. The presence of dehydration catalytic elements, such as aluminum, thorium, titanium, chromium, and zirconium, is particularly advantageous in such contact mass compositions, especially when they are used for the reduction of nitro compounds to the corresponding amines, as these reactions result in the formation of water as one of the reaction products.

The contact masses described, when used at low temperatures with large excesses of hydrogen, operate to transform aromatic nitro compounds, such as nitrobenzene, to amines of high purity, particularly when the temperature is between 180 and 200° C. At higher temperatures, from 220 to 300° C., the amines begin to become hydrogenated to compounds such as cyclohexylamine, dicyclohexylamine, and cyclohexylaniline in the case of nitrobenzene, and as the temperature rises these hydrogenated compounds become the main reaction products. Aliphatic nitro compounds in the presence of a large excess of hydrogen containing gases give amines at 180–250° C. Alkyl nitrites, oximes, Schiff's bases and nitriles may also be reduced to valuable amino compounds by the usual methods in the presence of catalysts described above.

Heterocyclic compounds can also be reduced and transformed into valuable reaction products. Thus for example, pyrrol can be transformed into pyrrolidine, pyridine into amylamine, with breaking of the ring, quinoline to tetrahydroquinoline at 200° C., etc. Examples of the liquid phase reductions are the reductions of solutions of Schiff's bases to secondary amines at room temperatures, using a powdered contact mass as described, the amount of the contact mass being about 40–50% of the Schiff's base used, and care being taken to obtain a constant and intimate mixture of catalyst with the Schiff's base in order to insure good results. Examples of high temperature and high pressure reductions using the contact mass compositions described above are the reduction of nitrobenzene with 10–15% of finely powdered contact mass at 100–120° C. under a pressure of 10–15 atmospheres of hydrogen, aniline is the main product, but it is possible to stop the reaction at intermediate stages, such as azoxy, azo and hydrazo stages, by varying the amount of hydrogen used.

*Example 9*

100 parts of an artificial zeolite, such as the "permutit" obtainable chemically for water-softening purposes, are extensively treated with 3–5% copper nitrate solution until a maximum amount of exchangeable alkali is replaced by copper oxide. It is advantageous to use base exchange bodies of high base exchanging power, and preferably zeolites of the alumino silicate type should be used. Other zeolites of the same type in which the aluminum is replaced partly or wholly by other amphoteric metal oxides also have high base exchanging power.

The copper zeolite prepared as described above may be used for the catalytic reduction of aromatic nitro compounds, such as nitrobenzene, nitrotoluene or nitroanisole to the corresponding amines in the presence of 10–15 times the theoretical amount of hydrogen in a circulatory process. Carbon monoxide and steam may also be used instead of hydrogen containing gases, for example, when vapors of nitrobenzene are mixed with carbon monoxide and steam and passed over the contact mass at 200–220° C. an aniline of excellent purity results.

Instead of introducing copper, other catalytically active radicals, such as tin or nickel, or a mixture, may be introduced in the same way, using for example a 5–10% nickel nitrate solution which is repeatedly permitted to trickle over the zeolite at 40–50° C. to introduce a maximum of nickel. Such contact masses may be used for the catalytic oxidation of nitrobenzene to aniline by vaporizing the nitrobenzene and steam at 110–130° C., mixing with hydrogen gas, and passing over the contact mass under the proper loadings. A high grade aniline free from nitrobenzene is obtained by this method. Similarly orthonitroanisole can be reduced to orthoaminoanisole.

The contact masses described can be further toned to increase their efficiency by subjecting them to reactions with salts of metal acids of the fifth and sixth groups of the periodic system, such as vanadium, chromium and molybdenum, in order to form the so called salt-like bodies. This can be advantageously effected by trickling a 1% solution, for example a 1% ammonium vanadate solution, over the contact mass and then washing the salt-like body obtained. The resulting contact masses containing nickel or copper in exchangeable form are well suited for the catalytic reduction of pyridine to piperidine with a large excess of hydrogen containing gases at 200° C.

The base exchange bodies described, containing copper in exchangeable form, may also be carefully leached with dilute acid in order to remove some of the alkali which has not been replaced with copper. The contact masses thus produced are well suited for the reduction of 3-nitropyridine to 3-aminopyridine of high purity using an excess of hydrogen at 200–250° C. The same contact masses may also be used for the reduction of nitromethane to high grade methylamine at 200° C.

*Example 10*

90 parts of zinc nitrate containing 6 mols of water are dissolved in 15 parts of water and sufficient concentrated sodium hydroxide is added to transform the zinc into the corresponding zincate. 16 parts of chromium oxide are then prepared by precipitating it from a 10% chromium nitrate solution with ammonia. The chromium oxide is precipitated in a finely divided form, and after thorough washing is stirred in 150 parts of water to form a slurry. A third solution of 48 parts of copper nitrate containing 3 mols of water dissolved in 280 parts of water or a corresponding amount of $SnCl_2.3H_2O$ is prepared and the chromium oxide suspension stirred into it. The mixture is then poured into the zincate solution with vigorous agitation, care being taken that the reaction mixture remains continuously alkaline. A gel forms which is sucked and dried at 80° C., forming hard vitreous fragments of a non-silicious base exchange body containing zinc or copper and tin and diluted with finely divided chromium oxide. The products are valuable contact masses for the reduction of organic nitrogen compounds. The chromium oxide may be substituted by salts of chromic acid, especially copper chromate, cadmium or aluminum chromate or salts, especially copper salts of vanadic acid, tungstic acid, and uranic acid can be used singly or in admixture. Lead oxide may also be used as a diluent, or part of the zinc may be replaced by a corresponding amount of plumbite. When lead is present or is the main component the contact masses reduce aromatic nitro compounds to the corresponding azoxy and azo compounds at 200° C. in the presence of an excess of hydrogen. Where the lead is absent, the contact masses may be used for the reduction of aromatic nitro compounds, such as nitrophenols, to amino phenols at 250° C., with an excess of hydrogen, the reaction conditions described being the same as those in the foregoing examples.

*Example 11*

The following solutions are prepared:

(1) 30 parts of nickel nitrate containing 6 molecules of water are dissolved in 200 parts of water and sufficient 25% ammonia water is added until a clear solution of nickel ammonium nitrate is obtained.

(2) 4 parts of freshly precipitated aluminum hydroxide are stirred into a slurry with 50 parts of water and then treated with sufficient 10 N sodium hydroxide solution to form a clear solution of sodium aluminate.

(3) 10 parts of chromium nitrate with 9 molecules of water are dissolved in 150 parts of water and then treated with sufficient 10 N sodium hydroxide solution to form sodium chromite.

(4) 8 parts of zinc nitrate containing 6 molecules of water are dissolved in 50 parts of water and treated with sufficient 10 N sodium hydroxide solution to form sodium zincate.

(5) 40 parts of nickel nitrate with 6 molecules of water are dissolved in 200 parts of water.

(6) 11 parts of zirconium nitrate with 5 molecules of water are dissolved in 150 parts of water.

(7) 16 parts of titanium nitrate are dissolved in 160 parts of water.

Solutions (1), (2), (3) and (4) are mixed together and 300 parts of gieselguhr, pumice meal or activated carbon, or a mixture, are stirred in. These diluents may also be replaced partly or wholly by silver-free nickel ore. Solutions (5), (6) and (7) are then mixed together and added to the suspension with vigorous agitation. A gelatinous reaction product forms, and if it is strongly alkaline to phenolphthalein the excess alkali may be neutralized by 5% nitric acid until just neutral, which results in an increased yield of base exchange body. The reaction product may also be salted out by a saturated ammonium carbonate solution.

After drying the product at temperatures preferably below 100° C. it constitutes a base exchange body containing sodium, ammonium, nickel, aluminum, chromium, zinc, zirconium and titanium. When broken into fragments the contact mass can be used for the catalytic reduction of acromatic nitro compounds to hydrogenated amines, such as nitrobenzene to cyclohexylamine at 240–260° C.

The contact mass can also be leached with dilute hydrochloric acid to remove the exchangeable alkali to the maximum extent. The leached base exchange body, particularly in the form of a fine powder, may be used for the reduction of nitro compounds in the liquid phase. Where copper is used instead of nickel in the base exchange body the leached contact masses are well suited for very sensitive catalytic reductions of organic nitro compounds as the reduction of 3-nitropyridine to 3-aminopyridine in the presence of an excess of hydrogen at 180–200° C.

This application is in part a continuation of my copending application Serial No. 142,783, filed October 19, 1926, and Patent No. 1,694,620, issued December 11, 1928.

In the claims the term "permutogenetic" covers base exchange bodies, silicious or non-silicious, the products obtained by the acid leaching of these base exchange bodies and the salt-like bodies obtained by the reaction of these base exchange bodies with compounds the acid radicals of which are capable of reacting with the base exchange bodies to produce products which show most of the properties of salts. When used in the claims, the term "permutogenetic" will have no other meaning.

What is claimed as new is:

1. A method of reducing organic nitrogen compounds which comprises subjecting the compounds to the action of reducing gases in the presence of a contact mass containing at least one permutogenetic body.

2. A method of reducing organic nitrogen compounds which comprises vaporizing the compounds and subjecting the vapors to reaction with reducing gases at reaction temperatures in the presence of a contact mass which contains at least one permutogenetic body.

3. A method of reducing organic nitro compounds which comprises subjecting them to reaction with reducing gases in the presence of a contact mass containing at least one permutogenetic body.

4. A method of reducing organic nitro compounds which comprises vaporizing the compounds and subjecting the vapors to reaction with reducing gases at reaction temperatures in the presence of a contact mass containing at least one permutogenetic body.

5. A method of producing amines from organic nitro compounds which comprises vaporizing the nitro compounds and subjecting the vapors to reaction with reducing gases at reaction temperatures in the presence of a contact mass containing at least one permutogenetic body, the temperature being below that at which substantial hydrogenation takes place with the contact mass used.

6. A method according to claim 1 in which at least one catalytically effective component of the contact mass is chemically combined in the permutogenetic body.

7. A method according to claim is in which at least one catalytically effective component of the contact mass is present in the form of a diluent physically homogeneously associated with the permutogenetic body.

8. A method according to claim 1 in which at least one of the catalytically effective components is included within the group consisting of copper, tin, silver, nickel, iron, cobalt, and zinc.

9. A method according to claim 1 in which the contact mass has associated therewith at least one compound of an element included in the group consisting of alkali metals, alkaline earth metals and rare earth metals whose oxides are not reducible by hydrogen in chemical combination with the permutogenetic body.

10. A method of reducing aromatic nitro compounds to amino compounds which comprises causing them to react with reducing gases in the presence of a contact mass containing a permutogenetic body.

11. A method of producing amino compounds from aromatic nitro compounds which comprises vaporizing the nitro compound and causing it to react with reducing gases in the presence of a contact mass containing a permutogenetic body.

12. A method according to claim 2 in which the reduction is carried out in a process in which unreacted vapors are recirculated over the catalyst.

13. A method according to claim 2 in which the process is carried out in a circulatory manner in the presence of a large excess of reducing gas.

14. A method of producing substantially unhydrogenated amino compounds from aromatic nitro compounds which comprises vaporizing the nitro compound and causing it to react with reducing gas at temperatures not exceeding 250° C. in the presence of a contact mass containing a permutogenetic body.

15. A method of producing aniline from nitrobenzene which comprises subjecting a nitrobenzene to reaction with reducing gas in the presence of a contact mass containing a permutogenetic body.

16. A method of producing aniline which comprises vaporizing nitrobenzene and submitting the vapors to reaction with reducing gas at temperatures under 250° C. in the presence of a contact mass containing a permutogenetic body.

17. A method according to claim 1 in which the contact mass contains at least one catalyst included in the group consisting of oxidation catalysts, dehydration catalysts, dehydrogenation catalysts.

18. A method according to claim 1, in which the contact mass has associated therewith at least one compound of an element included in the group consisting of alkali metals, alkaline earth metals and rare earth metals whose oxides are not reducible by hydrogen and at least one catalyst included in the group consisting of oxidation catalysts, dehydration catalysts, dehydrogenation catalysts.

19. A method according to claim 1, in which the contact mass has associated therewith at least one compound of an element included in the group consisting of alkali metals, alkaline earth metals and rare earth metals whose oxides are not reducible by hydrogen and at least one catalyst included in the group consisting of oxidation catalysts, dehydration catalysts, dehydrogenation catalysts in chemical combination with the permutogenetic body.

Signed at Pittsburgh, Penna., this 16th day of January, 1928.

ALPHONS O. JAEGER.